United States Patent
Fujiwara et al.

(10) Patent No.: US 12,335,384 B2
(45) Date of Patent: Jun. 17, 2025

(54) ENCRYPTION KEY GENERATING DEVICE, ENCRYPTION KEY GENERATING PROGRAM, AND ENCRYPTION KEY GENERATING/ERASING METHOD

(71) Applicant: National Institute of Information and Communications Technology, Tokyo (JP)

(72) Inventors: Mikio Fujiwara, Tokyo (JP); Masahiro Takeoka, Tokyo (JP); Masahide Sasaki, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 156 days.

(21) Appl. No.: 18/550,788

(22) PCT Filed: Feb. 15, 2022

(86) PCT No.: PCT/JP2022/005802
§ 371 (c)(1),
(2) Date: Sep. 15, 2023

(87) PCT Pub. No.: WO2022/201966
PCT Pub. Date: Sep. 29, 2022

(65) Prior Publication Data
US 2024/0171386 A1 May 23, 2024

(30) Foreign Application Priority Data
Mar. 25, 2021 (JP) ................. 2021-051694

(51) Int. Cl.
*H04L 9/08* (2006.01)

(52) U.S. Cl.
CPC ............ *H04L 9/0877* (2013.01); *H04L 9/085* (2013.01); *H04L 9/0852* (2013.01); *H04L 9/088* (2013.01); *H04L 9/0894* (2013.01)

(58) Field of Classification Search
CPC ..... H04L 9/0877; H04L 9/085; H04L 9/0852; H04L 9/088; H04L 9/0894
(Continued)

(56) References Cited

U.S. PATENT DOCUMENTS

2003/0182566 A1* 9/2003 Kohara ................. H04L 9/0894 713/193
2005/0141716 A1* 6/2005 Kumar ................... H04B 10/70 380/255

(Continued)

FOREIGN PATENT DOCUMENTS

CN 108306729 A 7/2018
WO 2005046114 A2 5/2005

OTHER PUBLICATIONS

Extended European Search Report pertaining to European Patent Application No. 22774766.4, mailed Feb. 20, 2025.
(Continued)

*Primary Examiner* — Dereena T Cattungal
(74) *Attorney, Agent, or Firm* — GRUMBLES LAW PLLC; Brittany Haanan (57) ABSTRACT

An encryption key generating device includes a shared key separator separating a shared key into a first key and a second key and storing the first key in a non-volatile memory and storing the second key in a volatile memory; a key extender extending the second key to the same key length as that of the first key and storing the second key extended as a third key in the volatile memory; a key
(Continued)

calculator calculating an encryption key by an exclusive-OR of the first key and the third key and storing it in the volatile memory.

4 Claims, 7 Drawing Sheets

(58) Field of Classification Search
USPC .......................................................... 380/286
See application file for complete search history.

(56) References Cited

U.S. PATENT DOCUMENTS

| | | | |
|---|---|---|---|
| 2008/0147820 A1* | 6/2008 | Maeda | H04L 63/06 709/213 |
| 2013/0138961 A1* | 5/2013 | Tsuji | H04L 9/0816 713/171 |
| 2015/0244520 A1* | 8/2015 | Kariman | H04L 9/0656 713/168 |
| 2016/0306750 A1* | 10/2016 | Tucker | G06F 12/1408 |
| 2020/0186340 A1 | 6/2020 | Du et al. | |

OTHER PUBLICATIONS

International Conference on Computers, Systems & Signal Processing, Dec. 9-12, 1984, vol. 1, Bagalore, India, p. 175-179.
International Search Report and Written Opinion pertaining to PCT/JP2022/005802, mailed Apr. 19, 2022.
Takeshita et al., "Effect of attenuation on CPPM key generation", The 33rd Symposium on Information Theory and its Applications, Nov. 30-Dec. 3, 2010, Matsushiro, Japan, p. 278-285.

* cited by examiner

ENCRYPTION KEY GENERATING DEVICE, ENCRYPTION KEY GENERATING PROGRAM, AND ENCRYPTION KEY GENERATING/ERASING METHOD

TECHNICAL FIELD

This invention relates to an encryption key generating device, encryption key generating program, and encryption key generating/erasing method.

BACKGROUND ART

Quantum encryption is a well-known technique for achieving information-theoretic secure communication.

Quantum encryption includes processes of sharing of an encryption key between a data sender and receiver through quantum key distribution (QKD), and encrypting and decrypting data between the data sender and receiver using one time pad (OTP) encryption.

The quantum key distribution is a method of generating an encryption key (random number) according to a result of an estimation about an amount of leaked information using a property that a quantum state of a photon as a transmission medium is probabilistically changed by an observation (see, for example, NPL 1 (Non-Patent Literature 1), i.e., the BB84).

The one-time pad (OTP) encryption is a method that encrypts data with an encryption key (pad) at a sender and decrypts the encrypted data with the encryption key at an receiver, without using twice the encryption key once used. For example, as the encrypting/decrypting process of the OTP encryption, the Vernam one-time pad performs an exclusive-OR of each bit of data to be transmitted with the encryption key at both sides of the sender and receiver.

Usually, in the quantum encryption, when a large amount of data is transmitted, the sender and receiver consume a long time to share a large amount of encryption keys in advance.

The quantum encryption stores the large amount of encryption keys in a mass storage medium and erases used keys to secure data safety.

CITATION LIST

Non-Patent Literature

[NPL 1]
BB84: C. H. Bennett and G. Brassard, "Quantum cryptography: public-key distribution and coin tossing," in Proceedings of the IEEE International Conference on Computers, Systems and Signal Processing (Institute of Electrical and Electronics Engineers, New York, 1984), pp. 175-179.

SUMMARY OF INVENTION

Technical Problem

In a scheme like the quantum encryption, in which an encryption key is stored in the mass storage medium and deleted after use, it is difficult to erase data (encryption keys) on a conventional mass storage medium.

For example, in most of the conventional mass storage medium, it is often possible in principle to retrieve data even if the data is apparently erased, because only management information is simply erased. Specifically, it may be possible to recover data by probing the storage medium to search it, recovering the management information, or the like.

In addition, there is a technique to erase data stored on a storage medium by overwriting the stored data with arbitrary data for multiple times, but this technique is not feasible for the large-capacity storage medium used for the quantum encryption because it takes a very long time to overwrite the data with the arbitrary data.

As described above, in the conventional method of directly storing the encryption key for the quantum encryption in the storage medium, there is a problem that the data (encryption keys) is able to be extracted from the storage medium because data erasing is incomplete, which results in a security hole in communication using the quantum encryption.

Therefore, it is an object of the present invention to provide an encryption key generating device, encryption key generating program, and encryption key generating/erasing method that allows generating a certainly erasable encryption key from a shared key that is generated by the quantum key distribution and shared between a sender and a receiver.

Solution to Problem

In order to achieve the aforementioned object, an encryption key generating device according to the present invention is configured to generate an encryption key to be used in a one-time pad encryption from a shared key that is generated by the quantum key distribution and shared between a sender and a receiver, and to include a shared key separator, a key extender, and an encryption key calculator.

In such a configuration, the encryption key generating device causes the shared key separator to separate the shared key into a first key and a second key, and to store the first key in a non-volatile memory and the second key in a volatile memory. The second key is stored in the memory that is able to completely erase stored data when power is turned off. The first key is stored in the non-volatile memory to be able to be used as is even if a power supply failure occurs.

Next, the encryption key generating device causes the key extender to extend the second key to the same key length as the first key and to store the second key extended as a third key in a volatile memory. The third key is stored in a volatile memory that is able to completely erase stored data when the power is turned off.

Then, the encryption key generating device causes the encryption key calculator to calculate the encryption key by performing an exclusive-OR of the first key and the third key, and to store the encryption key in a volatile memory. The encryption key is stored in the volatile memory that is able to completely erase stored data when the power is turned off.

This allows the encryption key generating device to completely erase the encryption key and a part of the shared key for generating the encryption key by turning off the power.

Further, in order to solve the aforementioned problem, the encryption key generating program according to the present invention is configured to cause the computer to function as the shared key separator, the key extender, and the encryption key calculator, in order to generate the encryption key used in one-time pad encryption from the shared key that is generated by the quantum key distribution and shared between a sender and a receiver.

In the above-described configuration, the encryption key generating program causes the shared key separator to separate the shared key into a first key and a second key and to store the first key in a non-volatile memory and the second key in a volatile memory.

Next, the encryption key generating program causes the key extender to extend the second key to the same key length as that of the first key and to store the extended second key as the third key in the volatile memory.

Then, the encryption key generating device causes the encryption key calculator to calculate the encryption key by performing exclusive-OR of the first key and the third key and to store the encryption key in the volatile memory.

Furthermore, in order to solve the aforementioned problem, an encryption key generating and erasing method according to the present invention is provided for generating an encryption key used for one-time pad encryption from a shared key that is generated through the quantum key distribution to be shared between a sender and a receiver, and the method includes separating a shared key, extending a key, calculating an encryption key, and erasing a key.

In the above-described method, the encryption key generating and erasing method, first, in the separating a shared key, uses a shared key separator to separate the shared key into the first key and the second key and stores the first key in a non-volatile memory and the second key in a volatile memory.

Second, in the extending a key, the encryption key generating and erasing method uses a key extender to extend the second key to the same key length as that of the first key and to store the second key extended in the volatile memory as the third key.

Third, in the calculating an encryption key, the encryption key generating and erasing method uses an encryption key calculator to calculate the encryption key by performing an exclusive-OR of the first key and the third key and stores the encryption key in the volatile memory.

Finally, in the erasing a key, the encryption key generating and erasing method uses an encryption key generator to erase each generated key after the encryption key is used.

Effects

The embodiments of the present invention provides the following advantageous effects.

According to embodiments of the present invention, turning off the power completely allows erasing the encryption key and a part of the shared key for generating the encryption key. This allows the present invention to generate a securely erasable encryption key from a shared key generated by the quantum key distribution.

DESCRIPTION OF EMBODIMENTS

Hereinbelow, a detailed description is given of an embodiment for implementing the encryption key generating device, encryption key generating program, and encryption key generating/erasing method according to the present invention with reference to the drawings. Note that some figures abbreviate the term "encryption key" as "ENC-KEY."

<<Quantum Encryption System>>

Figure 1:
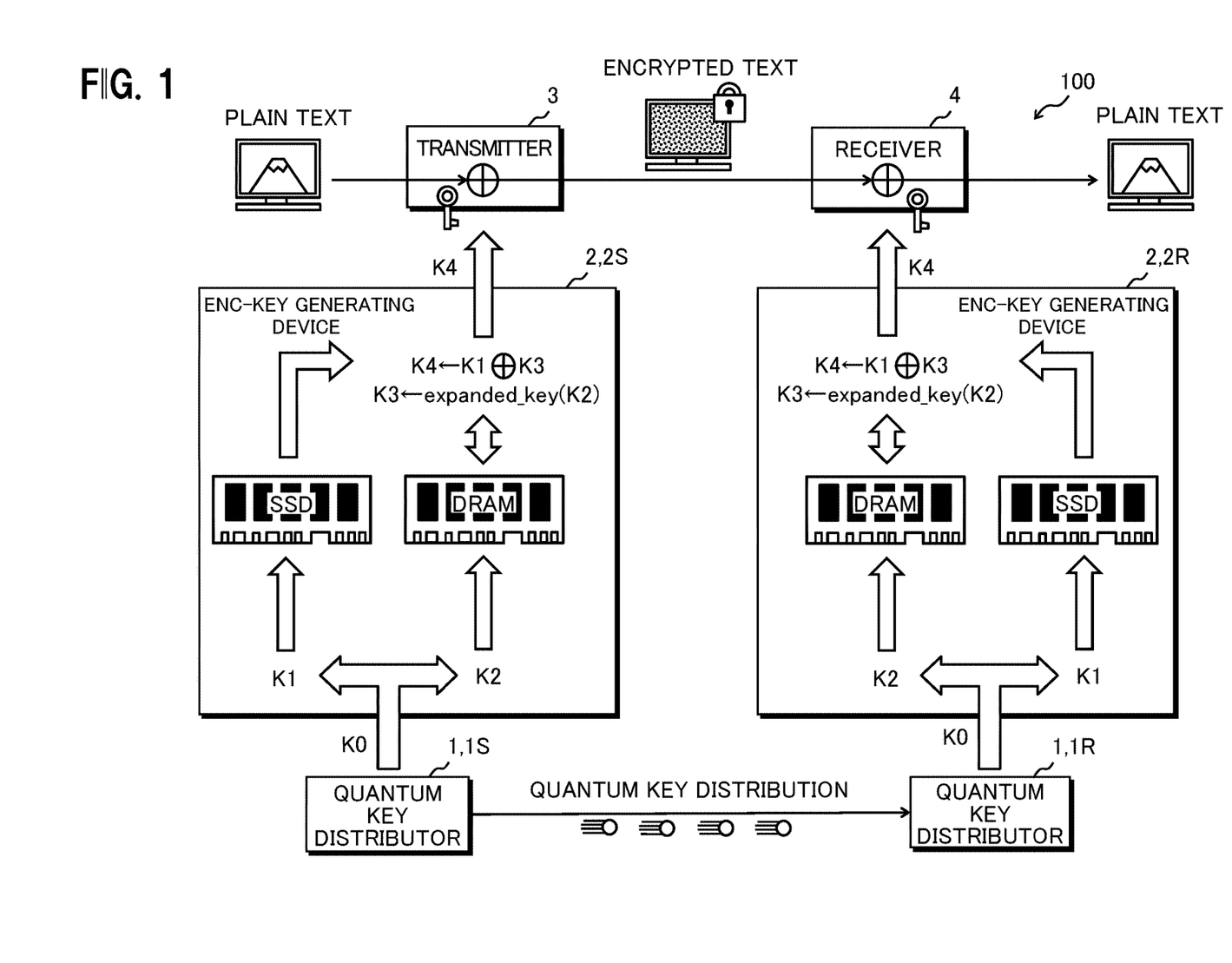
FIG. 1 is an overall configuration diagram illustrating a configuration of a quantum encryption system including an encryption key generating device according to an embodiment of the present invention.

With reference to FIG. 1, description is given of an overall configuration of a quantum encryption system including an encryption key generating device according to an embodiment of the present invention. FIG. 1 is an overall configuration diagram illustrating a configuration of a quantum encryption system including the encryption key generating device according to the embodiment of the present invention.

A quantum encryption system 100 is one of a quantum encryption system that generates an encryption key from a shared key sequentially generated by quantum key distribution (QKD), encrypts data (plain text), and transmits encrypted data from a transmitter 3 to a receiver 4.

The quantum encryption system 100 includes a quantum key distributor 1 (1S), an encryption key generating device 2 (2S), and the transmitter 3 as devices on a data sender; and a quantum key distributor 1 (1R), an encryption key generating device 2 (2R), and the receiver 4 as devices on a data receiver. The quantum key distributors 1S and 1R, and the encryption key generating devices 2S and 2R are respectively the same device, and the signs "S" and "R" are attached to distinguish the sender and receiver from each other.

Quantum key distributors 1 (1S, 1R) share a key of a random number sequence by the quantum key distribution (QKD). The quantum key distribution is a technique of sharing a key (hereinbelow referred to as "shared key K0") by transmitting and receiving photon pulses between the quantum key distributors 1S and 1R via an optical fiber and extracting a secure and error-free random number sequence having a predetermined data length through key distillation. A key length of the shared key K0 is set to be longer than that of an encryption key K4 used by the transmitter 3 and receiver 4 described below.

Note that a detailed explanation about the quantum key distribution is omitted here because it is a well-known technology.

The quantum key distributors 1 (1S, 1R) output the shared keys K0 sequentially generated to the encryption key generating devices 2 (2S, 2R).

The encryption key generating devices 2 (2S, 2R) generate the encryption key K4 for encrypting and decrypting data from the shared key generated by the quantum key distributors 1 (1S, 1R). A scheme of the quantum encryption system 100 is an encryption scheme that does not use any more an encryption key once used by the quantum encryption. Therefore, the encryption key generating device 2 has a function of storing multiple encryption keys K4 that it generates.

The encryption key generating device 2 separates each of the shared keys K0, which are sequentially generated by the quantum key distributor 1, into a first key K1 and a second key K2. A key length of the first key K1 is the same as that of an encryption key K4 to be used by the transmitter 3 and receiver 4 described below. Then, the encryption key generating device 2 stores the first key K1 in a non-volatile memory medium (for example, HDD (Hard Disk Drive), SSD (Solid State Drive), and the like). In addition, the encryption key generating device 2 stores the second key K2 in a volatile memory medium (for example, DRAM (Dynamic Random Access Memory), SRAM (Static Random Access Memory), and the like).

The encryption key generating device 2 generates a third key K3 by extending the second key K2 so that its key length is the same as that of the first key K1, and stores the third key K3 in a volatile memory medium (DRAM). Then, the encryption key generating device 2 generates the encryption key K4 by performing an exclusive-OR of the first key K1 and the third key K3, and stores the encryption key K4 in a volatile memory medium (DRAM).

And then, the encryption key generating device 2 outputs the encryption key K4 to the transmitter 3 and the receiver 4 as a one-time pad.

After outputting the encryption key K4, the encryption key generating device 2 deletes the encryption key K4, and the first key K1, second key K2, and third key K3 used to generate the encryption key K4.

Details of a configuration and operation of the encryption key generating device 2 are described below.

The transmitter 3 encrypts plain-text data and transmits encrypted data to the receiver 4.

The transmitter 3 encrypts data by performing an exclusive-OR of the encryption key K4 output from the encryption key generating device 2S and data having the same bit length as that of the encryption key K4.

Here, the transmitter 3 encrypts data with the encryption key K4 (*pad*), and encrypts the data with a one-time pad (OTP) encryption technique that does not use the encryption key K4 that is once used.

The transmitter 3 transmits the encrypted data (encrypted text) to receiver 4 via the data communication line.

The receiver 4 receives the encrypted data (encrypted text) from the transmitter 3 and decrypts it to the original data (plain text), The receiver 4 decrypts the data by performing an exclusive-OR of the encryption key K4, which is output from the encryption key generating device 2R and shared with the encryption key generating device 2S, and data with the same bit length as that the encryption key K4.

Here, the receiver 4 decrypts encrypted data (encrypted text) with the encryption key K4 (*pad*) and decrypts the data with a one-time pad (OTP) encryption that does not use the encryption key K4 that is once used.

As explained above, the quantum encryption system 100 is configured so that it does not use the shared keys K0, which are sequentially generated by the quantum key distribution (QKD), as an encryption key for encrypting or decrypting data, but uses the encryption keys K4 generated from the shared keys K0 by the encryption key generating device 2.

Note that the third key K3 has only computational security as a key because it is simply an extension of the second key but that the encryption key K4 has information-theoretic security because the encryption key K4 is generated by the exclusive-OR of the first key K1 separated from the shared key K0 and the third key K3 although the first key K1 is a part of the shared key generated by the quantum key distribution. Therefore, the quantum encryption system 100 is able to guarantee data security.

Further, the encryption key generating device 2 separates the shared key K0 into the first key K1 and the second key K2, stores the first key K1 in a non-volatile memory medium and the second key in a volatile memory medium, and stores each of the sequentially generated third keys and the encryption keys K4 in a volatile memory medium.

This allows the encryption key generating device 2 to thoroughly erase the second keys K2, third keys K3, and encryption keys K4 by turning off the power. Even if the first keys K1 stored in the non-volatile memory medium is leaked, it is difficult to estimate the third keys K3, and therefore, preventing leakage of the encryption keys K4.

<Configuration of Encryption Key Generating Device>

Figure 2:
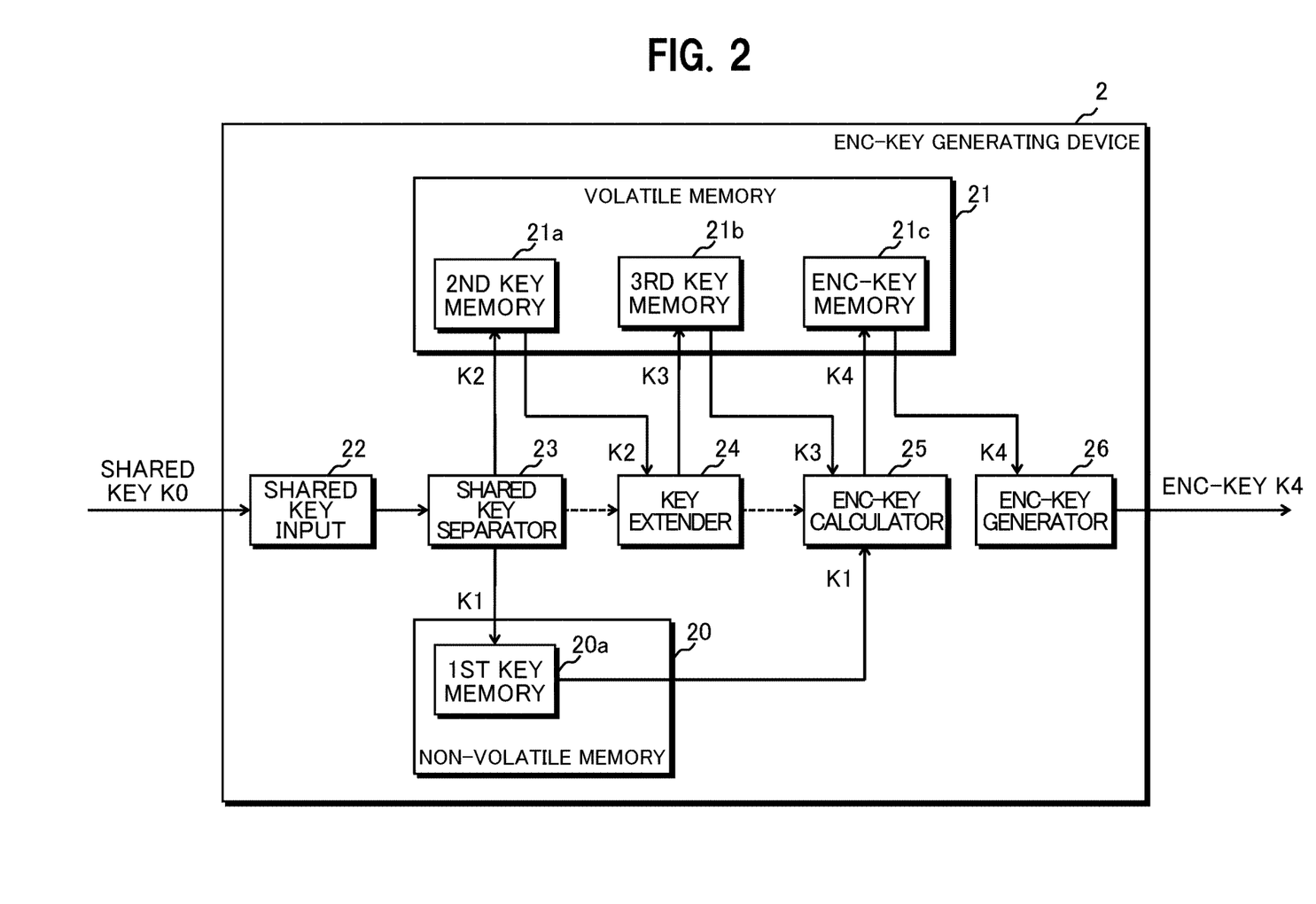
FIG. 2 is a functional block diagram showing a configuration of the encryption key generating device according to the embodiment of the present invention.

Next, with reference to FIG. 2 (see FIG. 1, as appropriate), a configuration of the encryption key generating device according to the embodiment of the present invention is described. FIG. 2 is a functional block diagram showing the configuration of the encryption key generating device according to the embodiment of the present invention.

The encryption key generating device 2 includes a non-volatile memory 20, a volatile memory 21, a shared key inputter 22, a shared key separator 23, a key extender 24, an encryption key calculator 25, and an encryption key generator 26.

The non-volatile memory 20 is a memory that stores data and is a non-volatile memory capable of retaining data even when the power is stopped to be supplied. For example, the non-volatile memory 20 can be composed of, for example, SSD and the like.

Here, the non-volatile memory 20 stores the first key K1 separated by the shared key separator 23 in the first key memory area 20*a*. Because only the first key K1 is stored in the non-volatile memory 20, the entire memory of the non-volatile memory 20 corresponds to the first key memory area 20*a*.

The first keys K1 stored in the non-volatile memory are sequentially read out by the encryption key calculator 25.

The non-volatile memory 20 has its data written, read, and erased by a memory controller, which is omitted to be illustrated in the figures.

The volatile memory 21 is a volatile memory capable of retaining data while power is supplied. For example, the volatile memory 21 can be composed of, for example, DRAM and the like.

Here, the volatile memory 21 stores the second key K2 separated by the shared key separator 23 in the second key memory area 21*a*. The volatile memory 21 also stores the third key K3 generated by the key extender 24 in the third key memory area 21*b*. Further, the volatile memory 21 also stores the encryption key K4 generated by the encryption key calculator 25 in the encryption key memory area 21*c*.

The second keys K2 stored in the volatile memory 21 are sequentially read out by the key extender 24. The third keys K3 stored in the volatile memory 21 are sequentially read out by the encryption key calculator 25. The encryption keys K4 stored in the volatile memory 21 are sequentially read out by the encryption key generator 26.

The volatile memory 21 has its data written, read, and erased by a memory controller, which is omitted to be illustrated in the figures.

The shared key inputter 22 sequentially inputs the shared keys K0 shared by the quantum key distributor 1.

The shared key inputter 22 outputs the input shared keys K0 to the shared key separator 23 in turn.

The shared key separator 23 separates the shared key K0 input by the shared key inputter 22 into the first key K1 and the second key K2. A way of separating the shared key K0 is made common in advance between the encryption key generating devices 2 (2S, 2R) on the data sender and receiver. For example, the shared key separator 23 extracts data from the predetermined bit position of the shared key K0 as the second key K2 and the remaining bits as the first key K1.

The shared key separator 23 writes and store the separated first keys K1 in the first key memory area 20a of the non-volatile memory 20 associating them respectively with sequential indexes. The shared key separator 23 also writes and store the separated second keys K2 in the second key memory area 21a of the volatile memory 21 associating them respectively with the same indexes as those of the first keys K1.

Figure 3A:
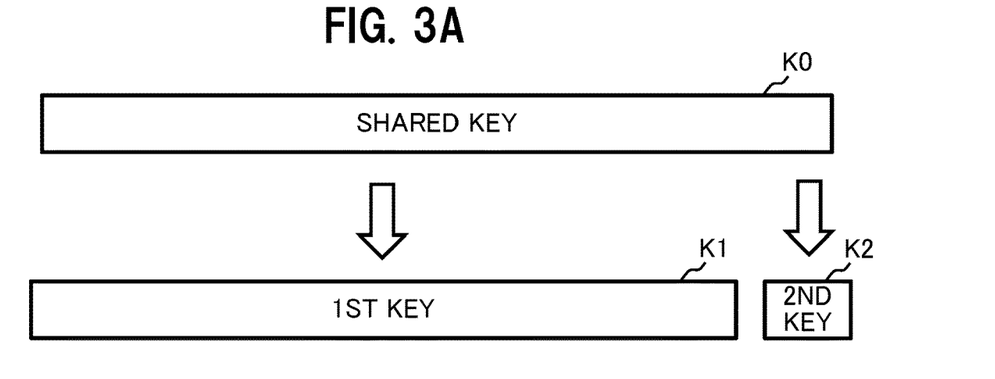
FIG. 3A is an illustration showing a shared key separation by a shared key separator of FIG. 2.

It is preferable that the first key K1 is sufficiently long relative to the second key K2 when the shared key separator 23 separates the shared key K0 into the first key K1 and the second key K2, as shown in FIG. 3A. For example, the second key K2 should be less than one-tenth of the shared key K0, more preferably less than one-hundredth. This purpose is to minimize data loss due to a power supply failure by storing the first key K1 in the non-volatile memory 20, because the first key is the majority of the shared key K0 generated by the quantum key distribution.

The shared key separator 23 notifies the key extender 24 that the second key K2 is stored in the volatile memory 21.

Figure 3B:
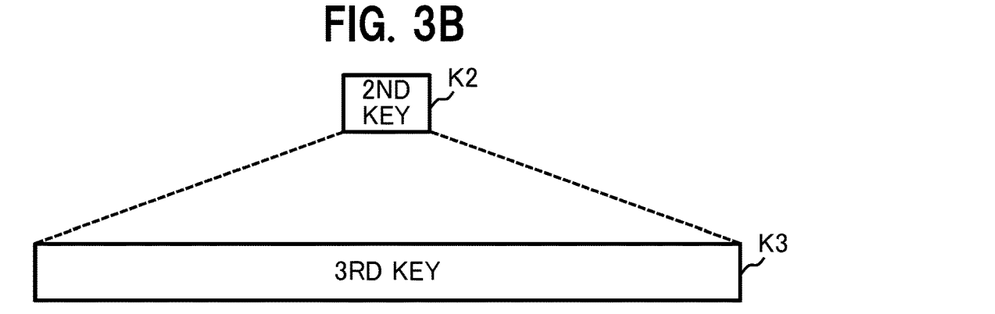
FIG. 3B is an illustration showing a key extension by a key extender of FIG. 2.

The key extender 24 extends the second key K2 stored in the volatile memory 21 to the same key length as the first key K1. In other words, the key extender 24 generates the third key K3 by extending the second key K2 having a short key length to the same key length as that of the first key K1, as shown in FIG. 3B.

For example, the key extender 24 can extend a key length using a key extension technique for the common key encryption scheme, Advanced Encryption Standard (AES).

The key extender 24 writes and store the third key K3 generated by extending the key length of the second key K2 in the third key memory area 21b of the volatile memory 21 associating the third key K3 with the same index as that of the second key K2.

The key extender 24 notifies the encryption key calculator 25 that the third key K3 is stored in the volatile memory 21.

The encryption key calculator 25 calculates the encryption key K4 by performing an exclusive-OR of the first key K1 and the third key K3.

Figure 3C:
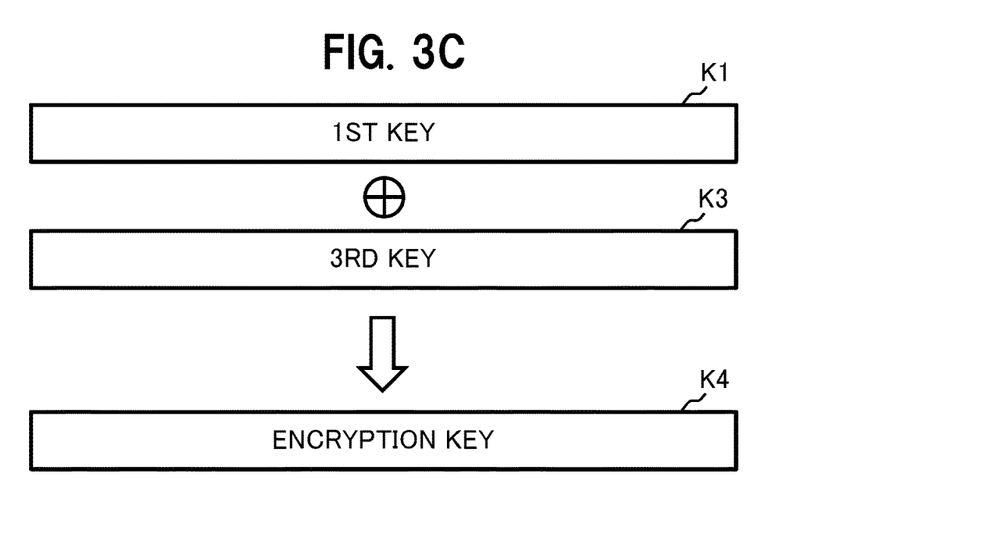
FIG. 3C is an illustration showing a calculation of an encryption key by an encryption key calculator of FIG. 2.

Specifically, as shown in FIG. 3C, the encryption key calculator 25 calculates the encryption key K4 by performing the exclusive-OR of the first key K1 stored in the non-volatile memory 20 with the third key K3 stored in the volatile memory 21 and having the same index as the first key K1.

The encryption key calculator 25 writes and store the calculated encryption key K4 in the encryption key memory area 21c of the volatile memory 21 associating it with the same index as that of the first key K1.

Note that the third key K3 has only computational security but that the encryption key K4, which is generated by performing the exclusive-OR of the third key K3 and the first key K1, has information-theoretic security.

The encryption key generator 26 sequentially reads the encryption keys K4 stored in the volatile memory 21 to output them to outside of the system when directed to do so from the outside of the system. In the encryption key generating device 2S at the data sender, the encryption key calculator 25 outputs the encryption key K4 that is read out to the transmitter 3. In the encryption key generating device 2R at the data receiver, the encryption key calculator 25 outputs the encryption key K4 that is read out to the receiver 4.

After outputting the encryption key K4, i.e., after using the encryption key K4, the encryption key generator 26 deletes (erases) the first key K1, second key K2, third key K3, and encryption key K4 that have the same index.

Here, the encryption key generator 26 deletes the first key K1, second key K2, third key K3, and encryption key K4 via the memory controller, which is omitted to be shown in the figures.

However, even if each key is deleted from management data, it sometimes remain in memory as data, and the encryption keys K4 may be leaked by a probe attack and the like. Therefore, the encryption key generating device 2 shall have its power turned off after data transmission from the transmitter 3 to the receiver 4 is completed. This completely erases the second keys K2, third keys K3, and encryption keys K4 stored in the volatile memory 21. Although the first keys K1 may remain in the non-volatile memory 20, it is difficult to estimate the third keys K3 even if the first keys K1 is leaked, thus leak of the encryption keys K4 can be prevented.

Because the encryption key generating device 2 stores the second keys K2, third keys K3, and encryption keys K4 in the volatile memory 21, the second keys K2, third keys K3, and encryption keys K4 are deleted in an event of power loss due to a power supply failure, or the like. However, most part of each of the shared keys K0 shared in the quantum key distribution (QKD) is retained as the first key K1. Therefore, when power is restored after an unexpected power loss, only the second key K2 needs to be shared again between the encryption key generating devices 2S and 2R.

For example, after power is restored, the encryption key generating device 2 may use as random number source the first keys K1 that are stored in the first key memory area 20a of the restored encryption key generating device 2 and shared among the encryption key generating devices 2S and 2R, generate the second keys K2 from the predetermined bit position, and generate the third keys K3 and encryption keys K4 in turn.

Further, for example, a sequence of random numbers having the key length of the second key K2 may be generated through the quantum key distribution by the quantum key distributors 1S and 1R and outputted to the encryption key generating devices 2S and 2R. In this case, the shared key separator 23 may not separate the input key but store it in the second key memory area 21a of the volatile memory 21 so that the third keys K3 and the encryption keys K4 are sequentially generated.

<Operation of Encryption Key Generating Device>

Figure 4A:
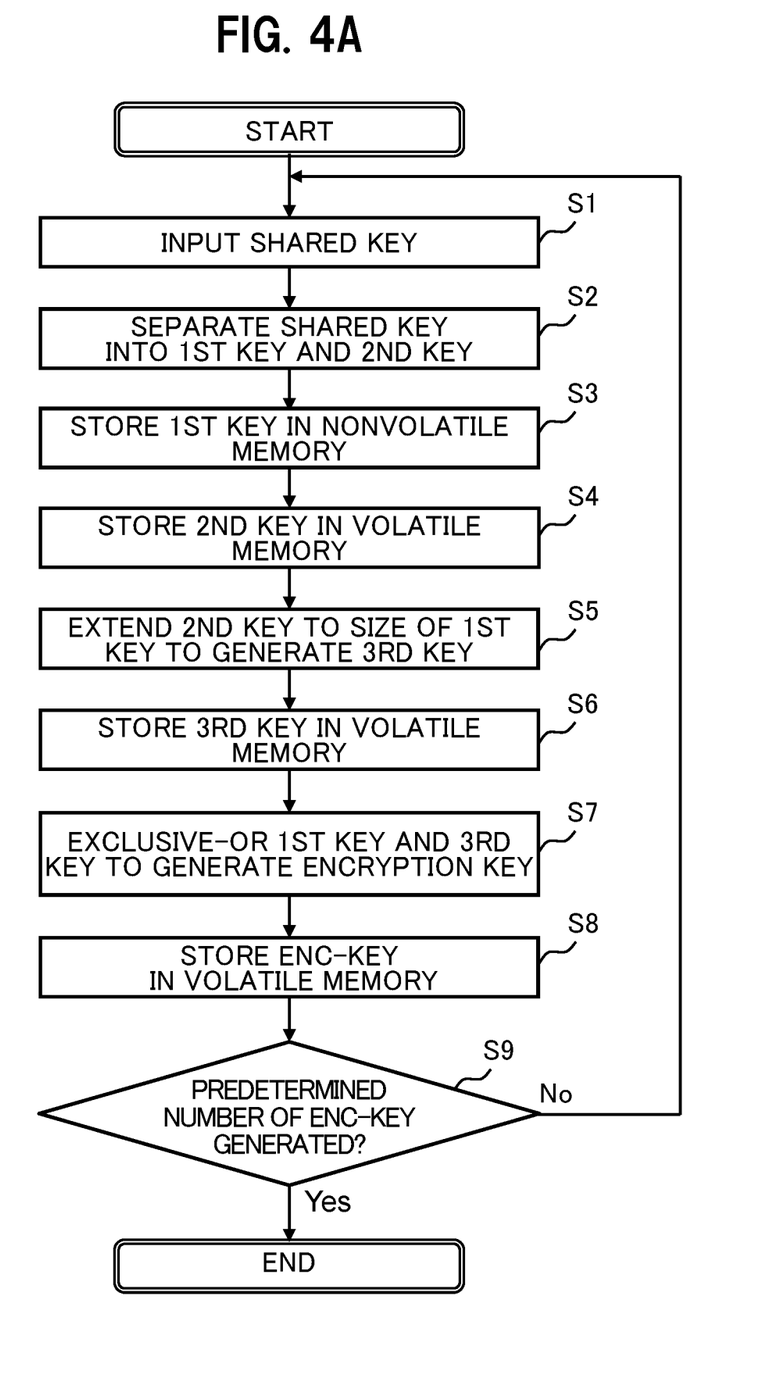
FIG. 4A is a flowchart showing an operation of an encryption key generation (encryption key generation process) of the encryption key generating device according to the embodiment of the present invention.

Next, description is given of an operation of the encryption key generation (method of encryption key generation) of the encryption key generating device according to the embodiment of the present invention with reference to FIG. 4A (see FIG. 2 for configuration as appropriate). FIG. 4A is a flowchart showing an operation of the encryption key generation (method of encryption key generation) of the encryption key generating device according to the embodiment of the present invention.

In step S1, the shared key inputter 22 inputs the shared key K0 shared by the quantum key distributors 1.

In step S2, the shared key separator 23 separates the shared key K0 input in step S1 into the first key K1 and the second key K2. At this time, the shared key separator 23 makes the first key K1 sufficiently long relative to the second key K2.

In step S3, the shared key separator 23 writes and store the first key K1 separated in step S2 in the first key memory area 20a of the non-volatile memory 20 associating it with the sequential index.

In step S4, the shared key separator 23 writes and stores the second key K2 separated in step S2 in the second key memory area 21a of the volatile memory 21 associating it with the same index as the first key K1.

The order of operation of steps S3 and S4 may be interchanged.

In step S5, the key extender 24 extends the second key K2 stored in the volatile memory 21 in step S4 to the same key length as that of the first key K1 to generate the third key K3.

In step S6, the key extender 24 writes and stores the third key K3 generated in step S5 in the third key memory area 21b of the volatile memory 21 associating it with the same index as the second key K2.

In step S7, the encryption key calculator 25 generates the encryption key K4 by performing an exclusive-OR of the first key K1 stored in the non-volatile memory 20 in step S3 and the third key K3 stored in the volatile memory 21 in step S6. At this time, the encryption key calculator 25 generates the encryption key K4 from the first key K1 and third key K3 corresponding to each other with respect to the same index.

In step S8, the encryption key calculator 25 writes and store the encryption key K4 generated in step S7 in the encryption key memory area 21c of the volatile memory 21 associating it with the same index as that of the first key K1.

In step S9, the encryption key calculator 25 determines whether the encryption keys K4 are generated up to a predetermined number. The predetermined number for the encryption keys K4 is determined in advance depending on a data length to be transmitted.

If the number of encryption keys K4 is less than the predetermined number ("No" in step S9), the encryption key generating device 2 returns to step S1 to continue the operation of the encryption key generation.

On the other hand, if the number of encryption keys K4 reaches the predetermined number ("Yes" in step S9), the encryption key generating device 2 terminates the operation of the encryption key generation.

This results in the predetermined number of encryption keys K4 being stored in the volatile memory 21.

Figure 4B:
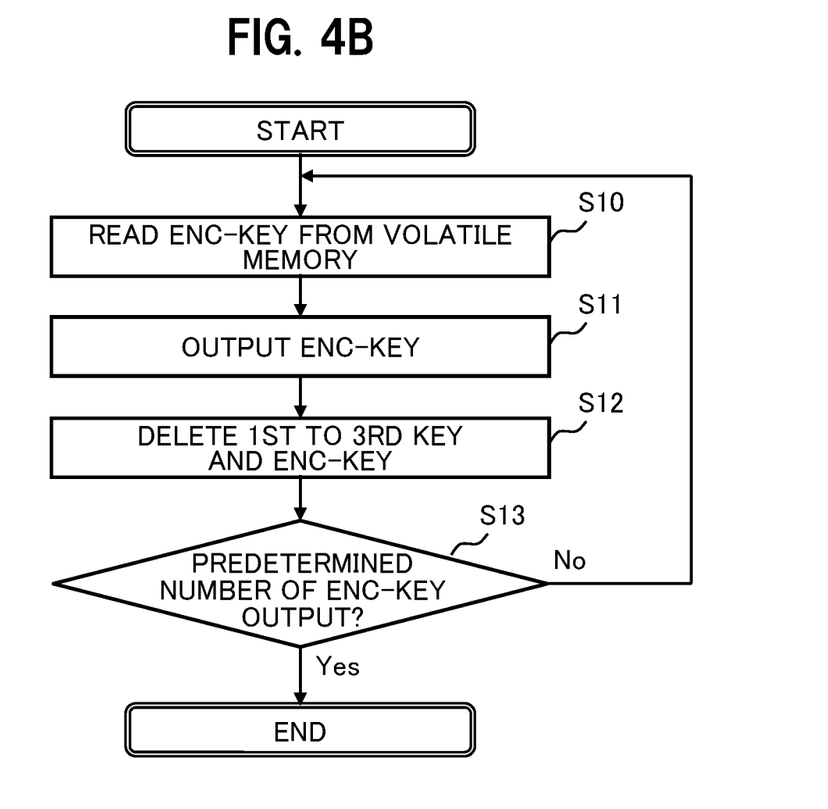
FIG. 4B is a flowchart showing an operation of an encryption key output (encryption key erasing process) of the encryption key generating device according to the embodiment of the present invention.

Next, description is given of an operation of the encryption key output (encryption key erasing method) of the encryption key generating device according to the embodiment of the present invention with reference to FIG. 4B (see FIG. 2 for configuration, as appropriate). FIG. 4B is a flowchart showing the operation of the encryption key output (encryption key erasing method) of the encryption key generating device according to the embodiment of the present invention.

In other words, the operation shown in FIG. 4B is an operation that outputs the encryption keys following a direction from outside of the encryption key generating device after the encryption keys are generated and stored in the volatile memory 21 through the operation shown in FIG. 4A.

In step S10, the encryption key generator 26 reads the encryption key K4 stored in the volatile memory 21 in order of the index.

In step S11, the encryption key generator 26 outputs the encryption key K4 read in step S10 to the outside (transmitter 3 or receiver 4).

In step S12, the encryption key generator 26 deletes the first key K1, second key K2, third key K3 and encryption key K4 having the same index as each other after outputting the encryption key K4 in step S11.

In step S13, the encryption key generator 26 determines whether it outputs a predetermined number of encryption keys K4. The predetermined number for the encryption key K4 is a number that is determined in advance depending on the data length to be transmitted and the same as the predetermined number in step S9 (FIG. 4A).

If the number of outputted encryption keys K4 is less than the predetermined number ("No" in step S13), the encryption key generating device 2 returns to step S10 to continue the operation of the encryption key output.

On the other hand, if the number of outputted encryption keys K4 reaches the predetermined number ("Yes" in step S13), the encryption key generating device 2 terminates the operation of the encryption key output.

After this operation is completed, the power of the encryption key generating device 2 is turned off.

This allows the encryption key generating device 2 to completely erase the encryption key K4 and the keys used for generating the encryption key K4, which allows preventing the leakage of the encryption key K4.

The above description explains the configuration and operation of the encryption key generating device 2 according to the embodiment of the present invention, but the invention is not limited to this embodiment.

Here, the encryption key generating devices 2 are configured as an independent devices that are placed between the quantum key distributor 1S and the transmitter 3 and between the quantum key distributor 1R and the receiver 4, as shown in FIG. 1.

Figure 5A:
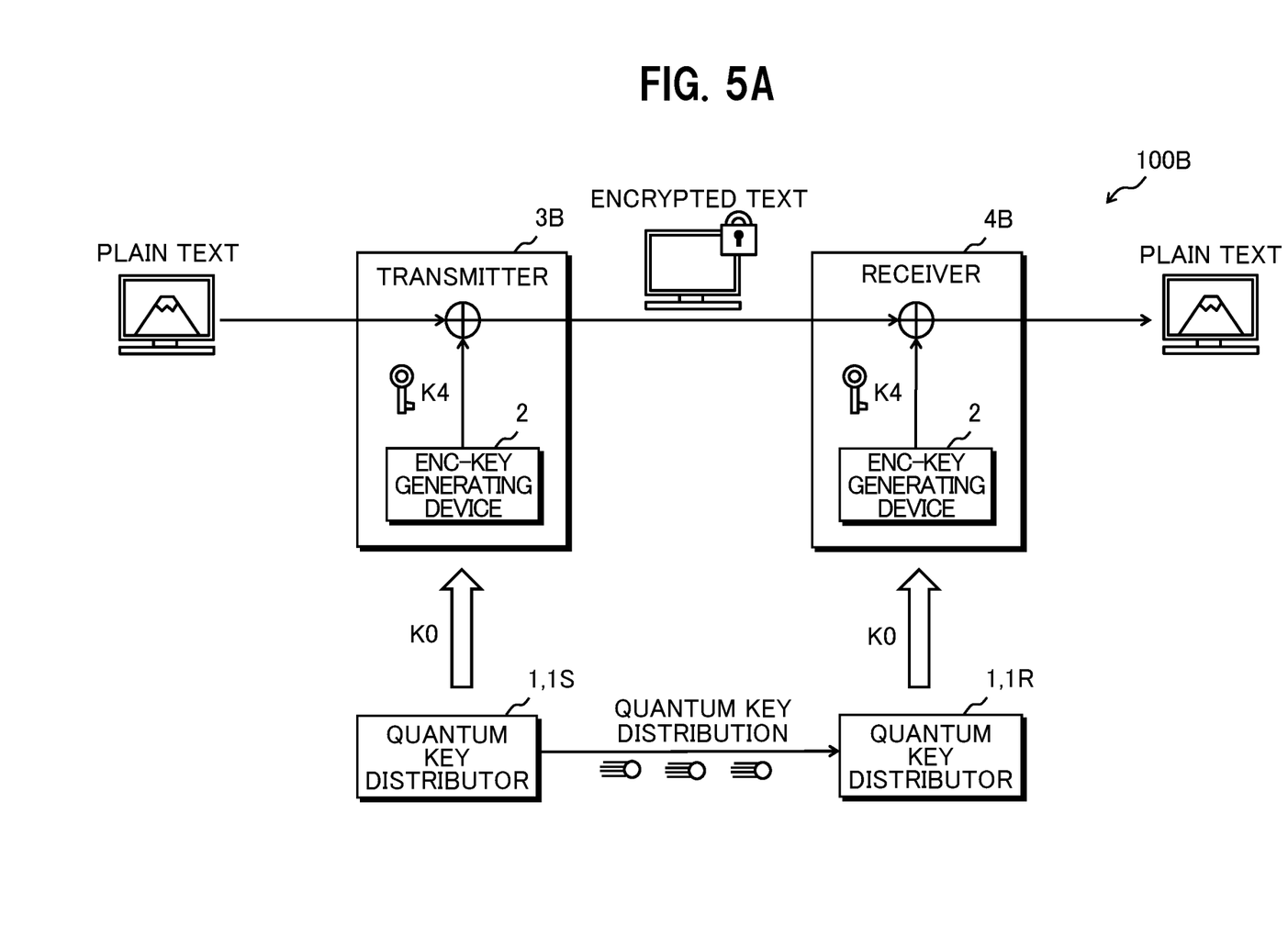
FIG. 5A is a schematic diagram illustrating the first modification of the quantum encryption system including the encryption key generating device according to the embodiment of the present invention.

However, the encryption key generating devices 2 may be configured to be placed inside the transmitter 3B and the receiver 4B like the quantum encryption system 100B shown in FIG. 5A.

Figure 5B:
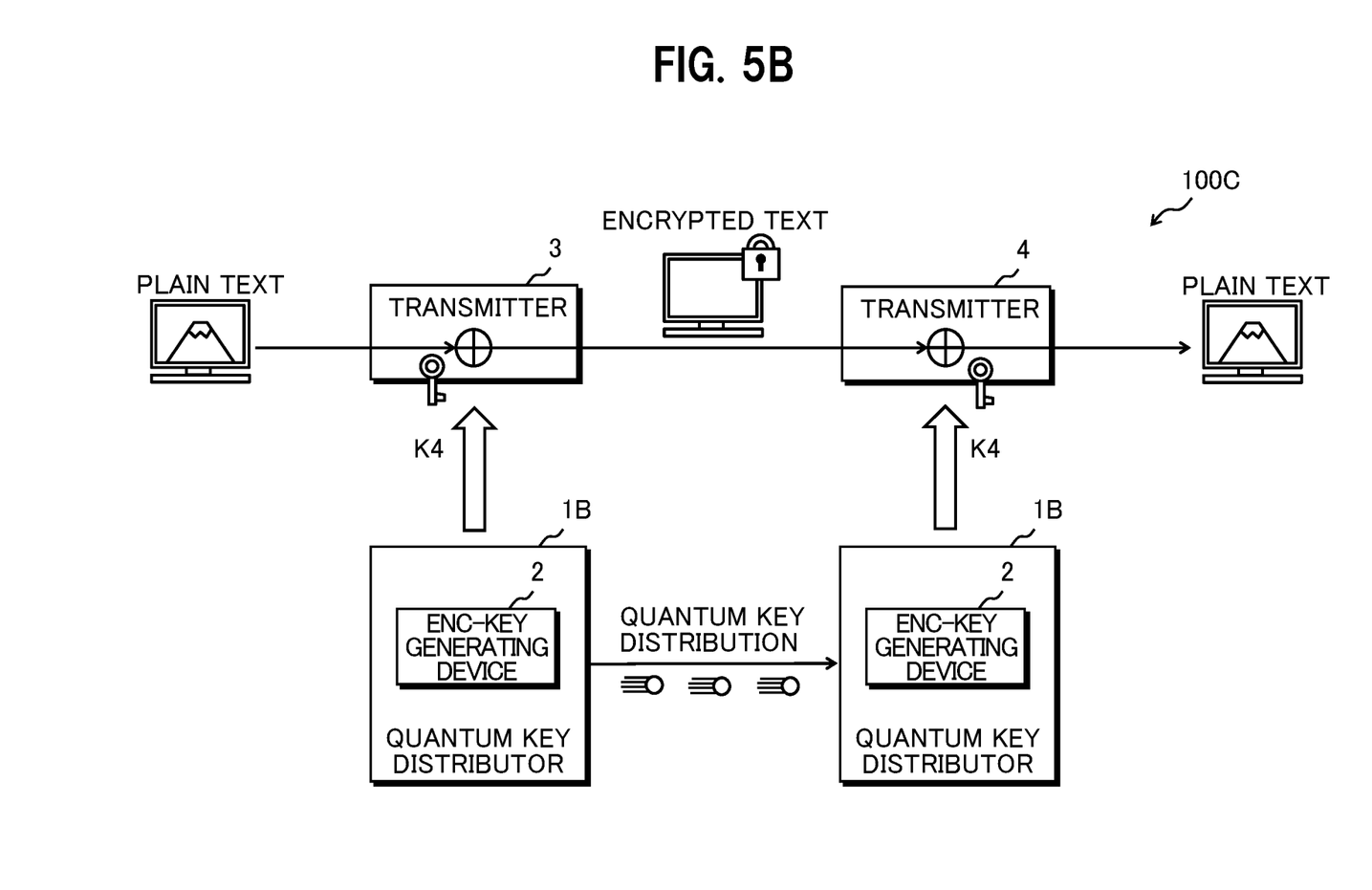
FIG. 5B is a schematic diagram illustrating the second modification of the quantum encryption system including the encryption key generating device according to the embodiment of the present invention.

Alternatively, the encryption key generating devices 2 may be configured to be placed respectively inside the quantum key distributors 1B like the quantum encryption system 100C shown in FIG. 5B.

REFERENCE SIGNS LIST

1: Quantum key distributor
2: Encryption key generating device
20: Non-volatile memory
21: Volatile memory
22: Shared key inputter
23: Shared key separator
24: Key extender
25: Encryption key calculator
26: Encryption key generator
3: Transmitter
4: Receiver
100: Quantum encryption system

The invention claimed is:

1. An encryption key generating device configured to generate an encryption key to be used in a one-time pad encryption from a shared key that is generated by quantum key distribution and shared between a sender and a receiver, comprising:
- a shared key separator configured to separate the shared key into a first key and a second key and to store the first key in a non-volatile memory and the second key in a volatile memory;
- a key extender configured to extend the second key to a key length equal to that of the first key and to store the second key extended as a third key in a volatile memory; and
- an encryption key calculator configured to calculate the encryption key by performing an exclusive-OR of the first key and the third key and to store the encryption key in a volatile memory.

2. The encryption key generating device according to claim 1, wherein
the shared key separator separates the shared key into the first key having a key length equal to that of the encryption key and the second key having a shorter key length than that of the first key.

3. A non-transitory computer-readable medium storing an encryption key generating program for generating an encryption key used for one-time pad encryption from a shared key that is generated by quantum key distribution and shared between a sender and a receiver, the program being configured to cause a computer to function as:
- a shared key separator separating the shared key into a first key and a second key and storing the first key in a non-volatile memory and the second key in a volatile memory;
- a key extender extending the second key to have a key length equal to that of the first key and storing the second key extended as a third key in the volatile memory; and
- an encryption key calculator calculating the encryption key by performing exclusive-OR of the first key and the third key and storing the encryption key in the volatile memory.

4. An encryption key generating and erasing method of generating an encryption key used for one-time pad encryption from a shared key that is generated through quantum key distribution to be shared between a sender and a receiver, comprising:
- separating the shared key using a shared key separator to separate the shared key into a first key and a second key and to store the first key in a non-volatile memory and the second key in a volatile memory;
- extending a key using a key extender to extend the second key having a key length equal to that of the first key and to store the second key extended in the volatile memory as a third key;
- calculating an encryption key using an encryption key calculator to calculate an encryption key by performing an exclusive-OR of the first key and the third key and to store the encryption key in the volatile memory; and
- erasing a key using an encryption key generator to erase each generated key after the encryption key is used.

* * * * *